April 8, 1958  S. A. SCHERBATSKOY  2,830,185
RADIATION DETECTOR
Filed Jan. 4, 1954  2 Sheets-Sheet 1

INVENTOR.
Sage A Scherbatskoy

April 8, 1958  S. A. SCHERBATSKOY  2,830,185
RADIATION DETECTOR

Filed Jan. 4, 1954  2 Sheets-Sheet 2

INVENTOR.

Serge A Scherbatskoy

United States Patent Office 2,830,185
Patented Apr. 8, 1958

2,830,185

RADIATION DETECTOR

Serge A. Scherbatskoy, Tulsa, Okla.

Application January 4, 1954, Serial No. 401,979

7 Claims. (Cl. 250—71)

This invention is concerned with a radiation detector and apparatus for performing measurements in a bore hole of radiations resulting from nuclear transformations within the formations adjoining said hole, said nuclear transformations being either spontaneous and caused by natural radioactivity or induced and caused by an external agent such as a source of neutrons placed adjacent to said formations in the neighborhood of the detecting instrument.

Many measurements have been made of the above radiations and particularly gamma radiations. These gamma radiations usually result from natural radioactive substances present in the formations or from the effect of irradiation of the formations with the stream of neutrons. The measurement of these radiations has been found useful in geophysical prospecting and in many instances the measurement of the radiations obtained from a geological structure has yielded valuable information as to the nature of the structure. Thus to cite an example, a radiation detector either alone or accompanied with a source of neutrons has been lowered into the bore hole in the earth and measurements were made at various levels of gamma rays derived from the formations.

It is not always sufficient, however, to have merely a measurement of the total gamma radiation obtained from a particular stratum, formation, or sample. In many instances the total amount of radiation will be the same for a plurality of strata, formations, or samples, and yet the strata, formations, or samples will vary widely in their nature.

This invention is therefore concerned with a method and apparatus for distinguishing between gamma rays on the basis of their hardness, that is their frequency or the energy contained in each quantum, and upon the application of this method and apparatus to geophysical prospecting by the examination of the formations themselves from the surface of the earth, or even more especially by the examination of formations below the surface of the earth through the medium of a drill hole.

The performance of the instrument embodying this invention is based essentially upon the capture of incoming neutrons by various elements contained in the formations adjoining the drill hole. These captures result in excitation of nuclei, said excitations resulting in emissions of gamma rays when excited nuclei return to their normal energy levels. The energy of gamma rays represent the excitation level of a given atomic nucleus. Therefore, to each element in the formations interacting with neutrons corresponds a characteristic value of the radiated gamma ray photon. For instance, an atom of hydrogen by capturing a neutron emits a gamma ray of energy 2.20 m. e. v. or an atom of aluminum by capturing a neutron emits a gamma ray of energy 8 m. e. v., etc. Consequently, the amount of radiation of a given energy represents the amount of a particular chemical element that is associated with said energy. In accordance with the present invention there is provided a method and apparatus for filtering radiations contained within very narrow energy ranges, said ranges corresponding to definite chemical elements. By continuously performing intensity measurements within said energy ranges at various depths of the bore hole, one may produce logs representing individually quantitative variations in the content of corresponding elements in the formations at said various depths.

It is an object of the present invention to provide an improved method and improved apparatus for determining the character of unknown substances particularly adjacent a bore hole.

Further objects and advantages of the present invention will become apparent as the following description proceeds, and the features of novelty which characterize the invention will be pointed out with particularity in the claims annexed to and forming part of this specification.

For further details of specific devices embodying the principles of this invention and for a more complete understanding of the mode of application of the principles of this invention and the numerous advantages thereof, reference may be had to the accompanying drawing in which.

Figure 1:
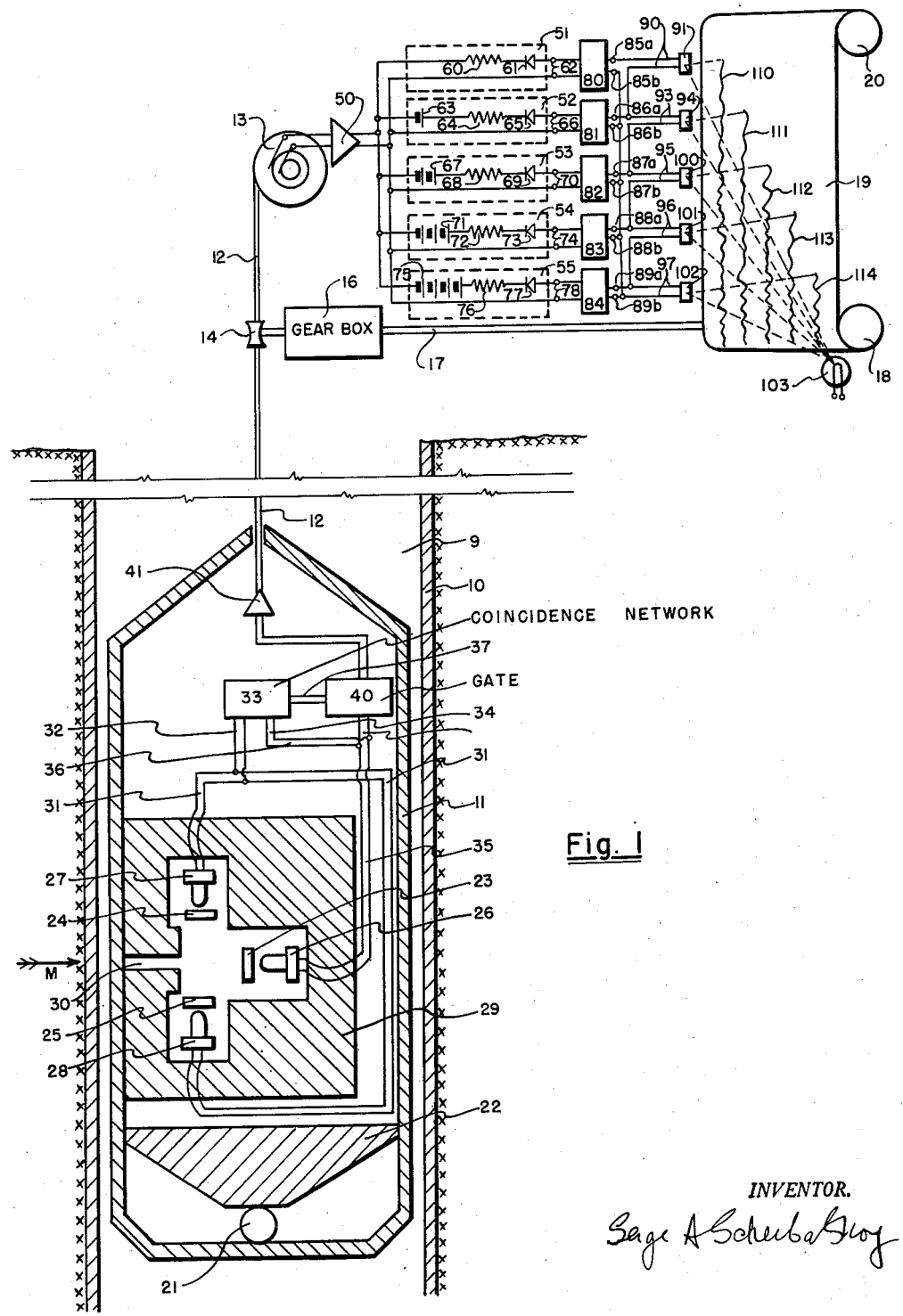
Fig. 1 illustrates diagrammatically a bore hole which penetrates the strata of the earth and the general arrangement for logging the bore hole in accordance with the principles of the present invention.

Referring now to the drawings and particularly Fig. 1 thereof, there is schematically illustrated a drill hole 9 penetrating the formations to be explored. The bore hole is provided in the conventional manner by a tubular metallic casing designated as 10.

For the purpose of exploring the formations along the bore hole there is provided in accordance with the present invention exploratory apparatus comprising a housing 11 which is lowered into the bore hole 9 by means of a cable 12, preferably including as a part thereof suitable insulated conduction. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 mounted on a shaft 15, and rotation of the reel and consequently of the shaft 15 is transmitted through a gear box 16 to another shaft 17 which is drivingly connected to take up spool 18 for moving a photographic film 19 from a feed spool 20 to take up spool 18.

As illustrated in Fig. 1 in the lower portion of the housing 11, there is provided a support on which is disposed a suitable source of neutrons generally designated as 21, such for example, as a radium beryllium preparation which may be enclosed in a container made of a suitable material, such as glass.

The radiations transmitted from 21 tend to propagate themselves in all directions. I have provided, however, an absorbing block 22 formed of materials, for example, such as lead and paraffin which is relatively opaque to penetrating radiations, the paraffin being relatively opaque to neutrons and the lead being relatively opaque to other radiations. I have therefore prevented a direct path between 21 and the detecting instrument positioned above the block 22. Consequently, the radiations emitted from 21 are directed sideways into the adjoining formations and the amount of radiations going upwards through the absorbing block is negligible.

The radiation detector located above the shield 22 is of scintillation counter type and comprises crystals in combination with photomultipliers. The crystals are adapted to convert the incoming gamma rays into impulses of light which subsequently impinge upon the corresponding photomultipliers provided with a suitable voltage supply. We obtain thus across the output terminals of such detector, current impulses which coincide with the arrival of gamma rays. More particularly, the detector comprises three sodium iodide crystals 23, 24, and 25 conveniently spaced one from the other in the manner shown in the drawing. In the immediate proximity of the crystal 23 is positioned a photomultiplier provided with a suitable voltage supply, the combined photomultiplier and voltage supply being designated as 26. Similarly, combined photomultiplier and voltage supplies designated by 27 and 28, respectively, are adjacent to the crystals 24 and 25.

The crystals 23, 24, and 25 are surrounded by a shield 29 made of tungsten, said shield forming an air-gap 30 and the crystal 20 is positioned opposite to said air-gap. The outputs of photomultipliers 27 and 28 are connected in parallel by means of leads 31 and applied to input terminals 32 of a coincidence network 33. The output of the photomultiplier 26 is applied to the input terminals 34 of the coincidence network 33 through leads 35 and 36. The network 33 is adapted to produce across its output terminals 37 a current impulse whenever impulses applied to the input terminals 32 and 34 arrive in coincidence. For literature on coincidence circuits see, for instance, Curran and Craggs, "Counting Tubes," Butterworth's Scientific Publications, London, 1949, pp. 134–139.

The output of the photomultiplier 26 is also connected through leads 35 and 39 to the input terminals of a gate 40, said gate having its output terminals connected to the cable 12 through an amplifier 41. The gate is normally closed, i. e. it does not allow the signal from the leads 39 to be transmitted to the cable 12. However, whenever an impulse appears across the output terminals 37 of the coincidence circuit, the gate is actuated and causes the impulses from the leads 39 to be transmitted through the cable 12 to the top of the bore hole.

The operation of this arrangement is as follows:

Crystals 24 and 25 are shielded from outside radiations by means of the shield 29 and the crystal 23 responds mainly to a collimated beam comprising those radiations that arrive laterally through the air-gap 30 along the directions indicated by the arrow M.

It is well known that the gamma rays intercepted by the crystal 23 usually undergo the process of Compton scattering in which a portion of the energy of the incoming photon is absorbed in the crystal in form of a recoil electron and another portion is scattered in form of an outgoing photon. Some of the incoming gamma rays undergo a scattering of about 135 degrees and the scattered photons are emitted by the crystal 23 in the direction of crystals 24 and 25. These scattered photons interact with the crystals 24 and 25 and produce impulses across the output terminals of the photomultipliers 27 and 28. It has been shown by Robert Hofstadter and J. A. McIntyre (Phys. Rev. 78, 619, 1950) that if we select only those photons that undergo Compton scattering in the crystal 23 at an angle of about 135° as a result of which they are deflected towards the crystals 24 and 25, then the energy that is initially lost by such photons in the crystal 23 (during the Compton scattering) is a measure of the energy of the photon. It is apparent that these selected photons actuate simultaneously the crystal 23 and one of the crystals 24 and 25. Our method consists therefore, in observing those occurrences at which the impulse from the photomultiplier 26 is simultaneous with the impulse from one of the photomultipliers 27 and 28, and measuring at such occurrences the magnitude of the impulse from the photomultiplier 26, said latter impulse representing the energy of the photon. Such a selection is effected by means of the coincidence network 33 which selects the occurrences at which the impulse from the photomultiplier 26 is simultaneous with the impulse from one of the photomultipliers 27, 28. We utilize the output of the network 33 to actuate the gate 40 in order to receive the output of the photomultiplier 26 during such occurrence.

It is thus apparent that the magnitude of an impulse across the output terminals of the gate 40 represents at any instant the energy of the corresponding photon. On the other hand, as stated above, the number of photons of a given energy represents the relative abundance in the formation of a particular chemical element that is associated with said energy. Thus the magnitudes of various impulses in the output of the gate 40 represent chemical elements and the relative frequency of impulses of a given magnitude represent the relative abundance of the corresponding chemical element.

Figure 2:
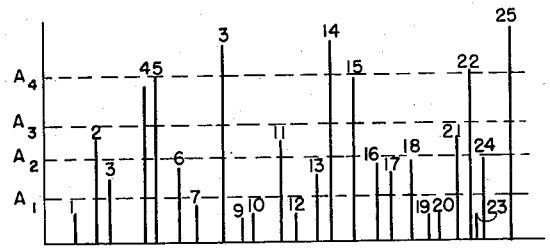
Fig. 2 shows diagrammatically current impulses representing gamma radiations of various energy values detected in the bore hole.

Fig. 2 gives a diagrammatical representation of the output of gate 40 in which abscissas represent the time of occurrences of the pulses and the ordinates represent the respective magnitudes of the pulses. The pulses have been designated by consecutive numerals such as 1, 2, 3, etc. These pulses have been subdivided into five energy groups which could be designated by Roman numerals I, II, III, IV, V and arranged in such a manner that:

Group I comprises pulses smaller than a predetermined value $A_1$. In Fig. 2 the pulses belonging to this group are designated as 1, 7, 9, 10, 12, 19, 20 and 23.

Group II comprises pulses larger than $A_1$ and smaller than a predetermined fixed value $A_2$. In Fig. 2 the pulses belonging to this group are designated as 3, 6, 13, 16, 17, 18 and 24.

Group III comprises pulses larger than $A_2$ and smaller than a predetermined fixed value $A_3$. In Fig. 2 the pulses belonging to this group are designated as 2, 11, 21.

Group IV comprises pulses larger than $A_3$ and smaller than a predetermined fixed value $A_4$. In Fig. 2 the pulses belonging to this group are designated as 4, 5, 15, and 22.

Group V comprises pulses larger than $A_4$. In Fig. 2 the pulses belonging to this group are designated as 8, 14, and 25.

The output pulses as shown in Fig. 2 are subsequently amplified in an amplifier 50 located above the opening to the bore hole and simultaneously applied to five gate elements designated by numerals 51, 52, 53, 54 and 55, respectively. Each gate element is characterized by a fixed threshold value and is arranged to transmit only those impulses the magnitude of which exceeds the corresponding threshold value. The gate element 51 has a zero threshold value, i. e., it is adapted to transmit all the impulses derived from the amplifier 50 while the threshold values characterizing the gate elements 52, 53, 54, 55 are $A_1$, $A_2$, $A_3$, and $A_4$, respectively. Consequently, the gate element 52 transmits impulses larger than the value $A_1$, the element 53 transmits impulses larger than the value $A_2$, the element 54 transmits impulses larger than the value $A_3$ and the element 55 transmits impulses larger than the value $A_4$.

The gate element 51 is a four terminal network comprising a resistor 60 in series with a rectifier 61 and provides across its output terminals 62 a succession of unidirectional impulses the magnitude of which represent the amounts of energy of gamma ray photons detected by the crystals 20, 21, and 22. The gate element 52 is a four terminal network provided with a battery 63 generating a voltage $A_1$ opposing the voltage impulses applied to the input terminals of the network. The battery 63 is in series with the resistor 64 and the rectifier 65. It is apparent that there is obtained across the output terminals 66 a succession of unidirectional impulses the magnitude of which represent the amounts of energy of the portion of the output of the relay 38, namely, the portion that comprises pulses larger than $A_1$.

The gate elements 53, 54 and 55 are of a similar construction to the element 52, i. e., they consist of four terminal networks having batteries 67, 71, and 75 connected in series with the resistors 68, 72 and 76 and the rectifiers 69, 73 and 77, respectively. The batteries 67, 71 and 75 generate voltages $A_2$, $A_3$ and $A_4$, respectively, that oppose the corresponding voltages applied to the input terminals of the networks 53, 54, and 55, respectively. It is apparent that there is obtained across the output terminals 70, 74 and 78 impulses derived from the relay 38 having magnitudes above threshold values $A_2$, $A_3$ and $A_4$, respectively.

The output terminals 62, 66, 70, 74, and 78 are respectively connected to frequency meters 80, 81, 82, 83, and 84. The frequency meters are of standard construction and adapted to produce outputs representing frequencies of impulses derived from terminals 62, 66, 70, 74, and 78, respectively. The frequency meter 80 is illustrated as having terminals 85a and 85b. Similarly, the frequency meters 81, 82, 83, and 84 are illustrated as having terminals 86a—86b, 87a—87b, 88a—88b, and 89a—89b, respectively. The direct current voltage appearing across the terminals 85a—85b; 86a—86b; 87a—87b; 88a—88b; and 89a—89b represent the frequencies of impulses above the threshold values 0, $A_1$, $A_2$, $A_3$, and $A_4$, respectively.

For the purpose of obtaining a record by groups of the pulses the outputs of adjacent frequency meters are connected in opposition so as to energize suitable galvanometer coils. As illustrated, the negative terminals 85b, 86b, 87b, 88b, and 89b are all connected in parallel. The terminals 85a and 86a are connected by means of leads 90 to a galvanometer coil 91 so that the latter is effected by the difference between frequencies of impulses above the threshold zero and below the threshold $A_1$. By referring to Fig. 2 it becomes apparent that this difference of voltages represents the frequency of impulses belonging to group I.

The outputs of frequency meters 81 and 82 are also connected in opposition, i. e., the negative terminal 86b has the same polarity as the negative terminal 87b. Consequently, the difference in the voltages at the terminals 86a and 87a is applied to a galvanometer coil 94 through the leads 93 and represents the difference between frequencies above the threshold $A_1$ and below $A_2$. By referring to Fig. 2 it is clear that this voltage difference represents the frequency of impulses belonging to group II.

Similarly, the output of frequency meters 82, 83 and 83, 84 are connected in opposition, thus producing across the leads 95 and 96 voltages representing frequencies of impulses belonging to groups III and IV, respectively.

The output of the frequency meter 84 is also separately applied to leads 97, thus producing a voltage representing the frequency of impulses belonging to group V. The leads 95, 96, and 97 are connected to galvanometer coils 100, 101, and 102, respectively. The galvanometer coils have attached thereto suitable mirrors in a manner well known to those skilled in the art and are adapted to reflect beams of light derived from a source 103 thereby effectively producing on the sensitive film 19 a record comprising five traces designated as 110, 111, 112, 113, 114, respectively, and representing the variations of the voltages applied to the galvanometers 91, 94, 100, 101, and 102, respectively.

The well logging process as above described permits analyzing the chemical composition of the earth's formation and also determining the relative quantities of various elements entering into said composition. Such a quantitative evaluation is based upon the characteristic frequency of gamma ray of capture emission from each element when returning from an excited to a normal level.

Consequently, the traces 110, 111, 112, 113, and 114 represent variations versus depth of the content of the chemical elements that can be identified by gamma ray energies represented by groups I, II, III, IV, and V.

The above method consists essentially in exciting the nucleus of various elements in the formation by irradiating said formation with a stream of neutrons derived from the source 25 and subsequently measuring various predetermined frequency components of resulting gamma radiations derived from said formations.

Figure 3:
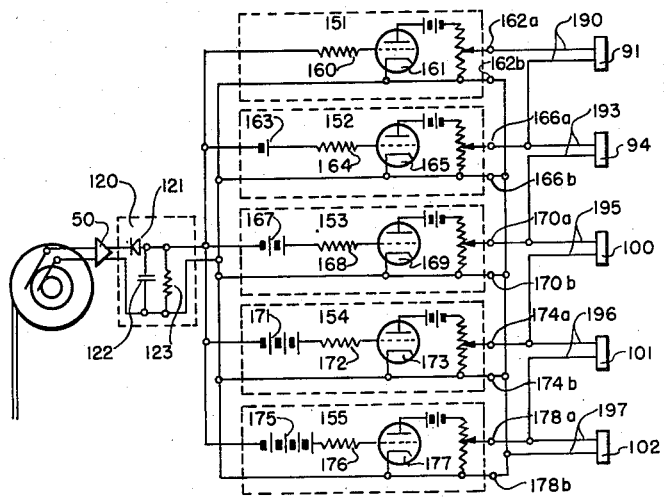
Fig. 3 shows another embodiment of my invention similar to the one in Fig. 1, but in which frequency measuring circuits have been eliminated.
Figure 4A:
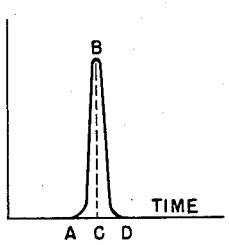
Figs. 4a, 4b, 4c represent diagrammatically the shapes of various impulses utilized in this invention.
Figure 4B:
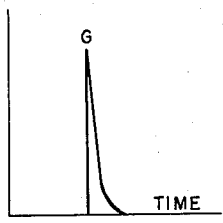

Fig. 3 represents a modified embodiment of the present invention in which like parts are designated by the same reference numerals as in the preceding figures. In Fig. 3 the output of the amplifier 50 representing the impulses derived from the counter 30 are applied to the input terminals of an impulse shaping network 120. The network 120 consists of a series arm comprising a rectifier 121 and a shunt arm comprising a condenser 122 in parallel with a resistance 123. The type of impulse applied to the input of the shaping network 120 may have the form shown diagrammatically in Fig. 4a in the form of a curve ABD representing the variation of the magnitude of the impulse with respect to time. The impulse starts at time A, then rises in accordance with a definite slope until time C at which instant it attains the maximum value CB then it decays until at time D it disappears or has zero value. Such a voltage impulse is effective suddenly to charge the condenser 122 and to cause the condenser to discharge through the resistance 123. As a result of this, there is obtained across the output terminals of the network 120 an impulse shown diagrammatically in Fig. 4b. The impulse is shown to start at the time instant F approximately coinciding with the time instant C, then it rises substantially instantaneously to its maximum value $FG=CB$ and subsequently decays in accordance with the line GH to reach zero value at the instant H. Thus the pulse shaping network 120 receives at its input terminals an impulse such as the one of Fig. 4a, rising gradually in accordance with line AB and produces across the output terminals a corresponding impulse shown in Fig. 4b rising almost instantaneously in accordance with line FG.

The impulses derived from the network 120 are then simultaneously applied to the gate elements 151, 152, 153, 154, and 155. Each gate element is characterized by a fixed threshold value and is arranged to transmit only those impulses the magnitude of which exceeds the corresponding threshold value. The gate element 151 has a zero threshold value, i. e., it is adapted to transmit all the impulses derived from the amplifier 50 while the threshold values characterizing the gate elements 152, 153, 154, 155 are $A_1$, $A_2$, $A_3$, and $A_4$, respectively. Consequently, the gate element 152 transmits impulses larger than the value $A_1$, the element 153 transmits impulses larger than the value $A_2$, the element 154 transmits impulses larger than the value $A_3$, and the element 155 transmits impulses larger than the value $A_4$.

The gate element 151 is a four terminal network comprising a resistor 160 in series with the grid circuit of a triode 161 and provides across its output terminals 162 derived from the plate circuit of the triode a succession of unidirectional impulses the magnitude of which represent the amounts of energy of gamma ray photons detected by the crystals 20, 21, and 22. The gate element 152 is a four terminal network provided with a battery 163 generating a voltage $A_1$ opposing the voltage impulses applied to the input terminals of the network. The battery 163 is in series with the resistor 164 and the grid circuit of a triode 165. It is apparent that there is obtained across the output terminals 166 connected to the plate circuit of the triode 165 a succession of unidirectional impulses the magnitude of which represents the amounts of energy of the portion of the output of the relay 38, namely, the portion that comprises pulses larger than $A_1$.

The gate elements 153, 154, 155 are of a similar construction to the element 152, i. e., they consist of four terminal networks having batteries 167, 171, and 175 connected in series with resistors 168, 172, and 176 and the grid circuits of the triodes 169, 173, and 177, respectively. The batteries 167, 171, and 175 generate voltages $A_2$, $A_3$, and $A_4$, respectively that oppose the corresponding voltages applied to the input terminals of the networks 153, 154, and 155, respectively. It is apparent that there is obtained across the output terminals 170, 174, 178 impulses representative of those derived from the counter 30 having magnitudes above threshold values $A_2$, $A_3$, and $A_4$, respectively.

Figure 4C:
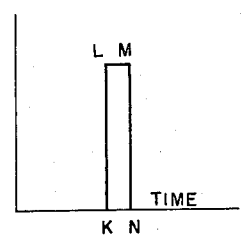

The impulses appearing at the output terminals of the gate elements are of a rectangular shape as shown in Fig. 4c. It is noted that they all are of the same height KL irrespective of the magnitude of the voltages applied to the grid circuits of triodes 161, 165, 169, 173, and 177.

The outputs of gate elements 151 and 152 are connected in opposition, i. e., the negative terminal 162b has the same polarity as the negative terminal 166b. Consequently, the difference of voltage between the terminals 162a and 166a is transmitted through the leads 190 to the galvanometer coil 91 and is representative of the frequency of impulses belonging to group I.

The outputs of gate elements 152 and 153 are also connected in opposition, i. e., the negative terminal 166b has the same polarity as the negative terminal 170b. Consequently, the voltage difference transmitted through the leads 193 to the galvanometer coil 94 represents the frequency of impulses of group II.

Similarly, the output of gate elements 153, 154 and 154, 155 are connected in opposition, thus producing across the leads 195, 196 voltages representing frequencies of impulses belonging to groups III and IV, respectively.

The output of the gate element 155 is also separately applied to leads 197, thus producing a voltage representing frequency of impulses belonging to the group V.

In view of the detailed description included above the operation of the present invention will be apparent to those skilled in the art. A record of the gamma radiations with respect to the depth of the drill holes is obtained with the radiations classified into a plurality of groups whereby the formation adjacent the bore hole at various depths is readily determinable.

Figure 5:
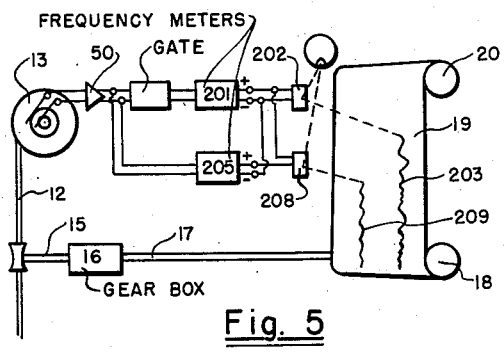
Fig. 5 shows another embodiment of my invention in which the effects of natural radioactivity have been separated from the effects due to the neutron radiation.

A particularly important feature of my invention is illustrated in Fig. 5 showing a modified portion of the surface equipment. As shown in Fig. 5, the output of the amplifier 50 is connected to the gate element 200 which is adapted to transmit only those impulses that correspond to gamma ray energies in excess of 3 m. e. v. The gate element 200 is connected to a frequency measuring network 201 which in turn energizes the galvanometer coil 202 to produce a trace 203, said trace representing the frequency of incoming gamma rays having energy in excess of 3 m. e. v.

The output of the amplifier 50 is also connected to a frequency measuring network 205, the output of said network representing the frequency of all gamma rays intercepted by the subsurface detector. The frequency measuring networks 201 and 205 are connected in opposition so as to produce a resultant signal representing the difference of the outputs of said networks. Said resultant signal is applied to the galvanometer coil 208 and produces a trace 209, said trace representing the frequency of incoming gamma rays having energies less than 3 m. e. v.

The gamma rays detected by the subsurface instrument can be broadly subdivided into two main groups. The first group comprises radiations that are produced by the naturally radioactive elements and also the gamma rays of capture due to hydrogen. The second group comprises the gamma rays of capture of all other elements. An important feature differentiating these two groups is based on the energy of the gamma rays, i. e. the energies corresponding to the first group are below 2.7 m. e. v., and the energies corresponding to the second group are within the range of 6 to 8 m. e. v. Consequently, these two groups can be conveniently separated by means of a threshold value such as 3 m. e. v. It is noted that by means of the arrangement of Fig. 5, we have completely separated from the output of the detector any radiations that were due to the naturally occurring element in the formation, i. e. the trace 203 depends only upon the effect of neutrons bombarding the formation and is entirely uninfluenced by any amounts of naturally radioactive elements that may be present in said formation.

While there have been illustrated and described various embodiments of the present invention, it is not desired that the invention be limited to the construction shown and described, for it will, of course, be obvious to those skilled in the art, that changes and modifications may be made without departing from the invention and it is therefore aimed in the appended claims to cover all such changes and modifications as fall within the true spirit and scope of this invention.

What is claimed as new and desired to be secured by Letters Patent of the United States is:

1. In an apparatus for measuring gamma radiation emitted by various formations surrounding a bore hole, a housing adapted to be lowered into said hole, said housing comprising two gamma ray detectors conveniently spaced one from the other, one of said detectors being adapted to selectively receive gamma radiation from a determined direction in said hole and to produce corresponding current impulses, and the other detector being adapted to receive selectively the radiations scattered by said first detector, and to produce corresponding current impulses, a means responsive to the outputs of said two detectors for selectively transmitting those impulses from the output of said first detector that are coincident with the impulses from the output of said second detector, at least two gate elements connected to said means, said gate elements being adapted to transmit the impulses from the output of said means in accordance with their magnitudes, means for lowering said housing into the bore hole, means for determining the depth at which said housing is lowered, and means for separately recording the outputs of said gate elements in correlation with said depth.

2. In an apparatus for measuring gamma radiation emitted by various formations surrounding a bore hole, a housing adapted to be lowered into said hole, said housing comprising two gamma ray detectors conveniently spaced one from the other, one of said detectors being adapted to selectively receive gamma radiation from a determined direction and to produce corresponding current impulses, and the other detector being adapted to receive selectively the radiations scattered by said first detector and to produce corresponding current impulses, means responsive to the outputs of said two detectors for selectively transmitting those impulses from the output of said first detector that are coincident with the impulses from the output of said second detector, at least two threshold devices connected to said means, said threshold devices being characterized by different threshold values for selectively and separately transmitting impulses exceeding said threshold value, an electric network connected to said threshold elements for producing a signal representing the difference of the magnitudes of their outputs, means for lowering said housing into the bore hole, means for determining the depth at which said housing is lowered, and means for recording said signal in correlation with said depth.

3. In an apparatus for measuring gamma radiation emitted by various formations surrounding a bore hole, a housing adapted to be lowered into said hole, said housing comprising two gamma ray detectors conveniently spaced one from the other, one of said detectors being adapted to selectively receive gamma radiations from a determined direction in said hole, and the other detector being adapted to receive selectively the radiations scattered by said first detector, a coincidence network having two pairs of its input terminals respectively connected to said detectors, a gate network connected to said first detector, said gate network being actuated by the output of said coincidence network, means for determining the depth at which said housing is lowered, and means for recording the output of said gate network in correlation with depth.

4. In an apparatus for measuring gamma radiation emitted by various formations surrounding a bore hole, a housing adapted to be lowered into said hole, said housing comprising two gamma ray detectors conveniently spaced one from the other, one of said detectors being adapted to selectively receive gamma radiation from a determined direction in said hole and to produce corresponding current impulses, and the other detector being adapted to receive selectively the radiations scattered by said first detector and to produce current impulses, a coincidence network having two pairs of its input terminals respectively connected to said detectors, a gate network connected to said detectors, at least two threshold elements connected to said gate network, said gate network being actuated by the output of said coincidence network to transmit the impulses from said first detector to said threshold elements, said threshold elements being adapted to selectively transmit said impulses in accordance with their magnitudes, means for lowering said housing into the bore hole, means for determining the depth at which said housing is lowered and means for separately recording the outputs of said gate elements in correlation with said depth.

5. In an apparatus for measuring gamma radiation emitted by various formations surrounding a bore hole, a housing adapted to be lowered into said hole, said housing comprising two gamma ray detectors conveniently spaced one from the other, one of said detectors being adapted to selectively receive gamma radiation from a determined direction in said hole and to produce corresponding current impulses, and the other detector being adapted to receive selectively the radiations scattered by said first detector and to produce corresponding current impulses, a coincidence network having its two input channels respectively connected to said detectors, a gate network connected to said detectors, at least two threshold devices characterized by different threshold values connected to said gate network for selectively and separately transmitting impulses, exceeding said threshold values, said gate network being actuated by the output of said coincidence network to transmit the impulses from said first detector to said threshold devices, an electric network connected to said threshold devices for producing a signal representing the difference of the magnitudes of their outputs, means for lowering said housing into the bore hole, means for determining the depth at which said housing is lowered and means for separately recording said signal in correlation with said depth.

6. In an apparatus for measuring gamma radiation emitted by various formations surrounding a bore hole, a housing adapted to be lowered into said hole, said housing comprising a shield means operative substantially to absorb gamma radiation externally impinging upon it, said shield being provided, however, with a relieved zone operative to permit gamma radiation arriving substantially in a predetermined plane to enter said housing, a first gamma-ray detector mounted within said housing and adapted to receive gamma radiation entering said housing through said relieved zone, and to produce corresponding current impulses responsively thereto, a second gamma-ray detector spatially disposed within said housing outside the influence of gamma radiation entering the housing through said relieved zone but disposed within the field of gamma radiation produced by Compton scattering in said first-mentioned detector and operative to produce current impulses responsively thereto, means fed by said first and second detectors for selectively transmitting impulses from said first detector that are substantially coincident in time with impulses from said second detector, means for lowering said housing, means for determining the depth of said housing, and means for recording said selectively transmitted impulses in correlation with depth.

7. Apparatus according to claim 6 wherein said second detector is positioned relative to said first detector so as to be selectively responsive to gamma radiation produced by Compton scattering in said first detector and oriented at an angle of approximately 135° to the plane of said gamma radiation entering said housing through said relieved zone.

References Cited in the file of this patent

UNITED STATES PATENTS

| | | |
|---|---|---|
| 2,316,361 | Piety | Apr. 13, 1943 |
| 2,349,753 | Pontecorvo | May 23, 1944 |
| 2,469,460 | Fearon | May 10, 1949 |
| 2,517,404 | Morton | Aug. 1, 1950 |
| 2,563,333 | Herzog | Aug. 7, 1951 |
| 2,610,303 | Bell | Sept. 9, 1952 |
| 2,617,042 | Wouters | Nov. 4, 1952 |